(12) United States Patent
Jonsson et al.

(10) Patent No.: US 10,009,212 B2
(45) Date of Patent: Jun. 26, 2018

(54) METHOD AND APPARATUS FOR ACTIVATION AND DEACTIVATION OF RADIO NETWORK FUNCTIONALITY

(71) Applicant: TELEFONAKTIEBOLAGET L M ERICSSON (PUBL), Stockholm (SE)

(72) Inventors: Anders Jonsson, Täby (SE); Erik De Wit, Rimbo (SE); Maria Hallmen, Järfälla (SE); Johan Husman, Täby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 194 days.

(21) Appl. No.: 14/295,938

(22) Filed: Jun. 4, 2014

(65) Prior Publication Data
US 2014/0362770 A1 Dec. 11, 2014

Related U.S. Application Data

(60) Provisional application No. 61/878,915, filed on Sep. 17, 2013, provisional application No. 61/833,546, filed on Jun. 11, 2013.

(51) Int. Cl.
*H04L 29/06* (2006.01)
*H04W 80/02* (2009.01)

(52) U.S. Cl.
CPC ............ *H04L 29/06* (2013.01); *H04W 80/02* (2013.01)

(58) Field of Classification Search
CPC .............................. H04L 29/06; H04W 80/02
See application file for complete search history.

(56) References Cited

U.S. PATENT DOCUMENTS

| 6,775,270 | B1 * | 8/2004 | Rhodes | H04W 88/181 370/352 |
|---|---|---|---|---|
| 2003/0206534 | A1 | 11/2003 | Wu | |
| 2004/0049794 | A1 * | 3/2004 | Shao | H04L 12/2805 725/89 |
| 2007/0104109 | A1 | 5/2007 | Jiang | |
| 2009/0104890 | A1 | 4/2009 | Wang et al. | |
| 2011/0026422 | A1 * | 2/2011 | Ma | H04W 72/0453 370/252 |

(Continued)

OTHER PUBLICATIONS

International Search Report and the Written Opinion of the International Searching Authority dated Sep. 1, 2014, in International Application No. PCT/SE2014/050688, 15 pages.

(Continued)

*Primary Examiner* — Michael Thier
*Assistant Examiner* — Zhensheng Zhang
(74) *Attorney, Agent, or Firm* — Sage Patent Group

(57) ABSTRACT

A method implemented in a first peer entity communicating with a second peer entity using a predetermined protocol includes receiving a first packet from the second peer entity. The method further includes identifying an instruction field included within the first packet, the instruction field indicating a predetermined function to be performed by the first peer entity. The method further includes determining whether the predetermined function can be performed by the first entity. The method also includes transmitting a second packet to the second peer entity indicating whether the first entity performs the predetermined function.

19 Claims, 18 Drawing Sheets

(56) References Cited

U.S. PATENT DOCUMENTS

2013/0294434 A1* 11/2013 Lee .................... H04W 76/023
370/338

OTHER PUBLICATIONS

Technical Specification, Universal Mobile Telecommunications Systems (UMTS); Radio Link Control (RLC) protocol specification (3GPP TS 25.322 version 11.2.0 Release 11), 2013, 94 pages.
Supplemental European Search Report issued in European Application No. 14811076.0-1870/3008969 dated Apr. 13, 2016, 5 pages.
'3rd Generation Partnership Technical Specification Network; Radio Link specification (Release 3GPP Standard; 3GPP Generation Partnership Mobile Competence Centre Lucioles ; F-06921; France, vol. RAN WG2, No. V11.2.0, Mar. 14, 2013 (Mar. 14, 2013), XP050692246, [retrieved on Mar. 14, 2013] Chapter 9.1 and 9.21.

\* cited by examiner

| Bit | PDU Type |
|-----|----------|
| 000 | STATUS |
| 001 | RESET |
| 010 | RESET ACK |
| 011 | PTP_MSG |
| 111 | Reserved |

FIG. 2

| D/C | PDU Type | SUFI |
|-----|----------|------|
| SUFI | | |
| ..... | | |
| SUFI | | |
| PAD | | |

FIG. 3

| Bit | Description |
|---|---|
| 0000 | Reserved |
| 0001 | Peer To Peer Message (PTP_MSG) |
| 0010 | Peer To Peer Message Acknowledge (PTP_MSG_ACK) |
| 0011 | Peer To Peer Message Negative Acknowledge (PTP_MSG_NACK) |
| 0100-1111 | Reserved (PDUs with this encoding are invalid for this version of the protocol) |

FIG. 4

| Bit | Description |
|---|---|
| 0000 | No More Data (NO_MORE) |
| 0001 | Window Size (WINDOW) |
| 0010 | Acknowledgement (ACK) |
| 0011 | List (LIST) |
| 0100 | Bitmap (BITMAP) |
| 0101 | Relative list (Rlist) |
| 0110 | Move Receiving Window (MRW) |
| 0111 | Move Receiving Window Acknowledgement (MRW_ACK) |
| 1000 | Poll (POLL) |
| 1001 | *Peer To Peer Message (PTP_MSG)* |
| 1010 | *Peer To Peer Messag Acknowledge (PTP_MSG_ACK)* |
| 1011-1111 | Reserved (PDUs with this encoding are invalid for this version of the protocol) |

FIG. 5

| Type |
|---|
| Length |
| Value |

FIG. 6

| Type = PTP_MSG |
|---|
| Length |
| Value |

FIG. 7

| Bit | Description |
|---|---|
| 0000 | Function Management |
| 0001 | Reserved |
| 0010 | Reserved |
| 0011-1111 | Not used |

FIG. 8

| Bit | Description |
|---|---|
| 0000 | Function Management |
| 0001 | Information 1 |
| 0010 | Information 2 |
| 0011-1111 | Not used |

FIG. 9

| Bit | Description |
|---|---|
| 0000 | Reserved |
| 0001 | UL compression enable |
| 0010 | UL compression disable |
| 0011-1111 | Reserved (PDUs with this encoding are invalid for this version of the protocol) |

FIG. 10B

| Bit | Description |
|---|---|
| 0000 | UL data compressor memory size in steps of 1024 Kbytes |
| 0001 | UL compression algorithm method |
| 0010 | UL compression algorithm version |
| 0011-1111 | Reserved (PDUs with this encoding are invalid for this version of the protocol) |

FIG. 10C

| Type = PTP_MSG_ACK |
|---|
| Length |
| Value |

FIG. 11

| Type = PTP_MSG_NACK |
|---|
| Length |
| Value |

FIG. 12

| Bit | Description |
|---|---|
| 0000 | No More Data (NO_MORE) |
| 0001 | Window Size (WINDOW) |
| 0010 | Acknowledgement (ACK) |
| 0011 | List (LIST) |
| 0100 | Bitmap (BITMAP) |
| 0101 | Relative list (Rlist) |
| 0110 | Move Receiving Window (MRW) |
| 0111 | Move Receiving Window Acknowledgement (MRW_ACK) |
| 1000 | Poll (POLL) |
| 1001 | Activate Functionality (ACT_FCT) |
| 1010 | Acknowledge Activated (ACK_ACT) |
| 1011-1111 | Reserved (PDUs with this encoding are invalid for this version of the protocol) |

FIG. 13

| Bit | Description |
|---|---|
| 000000 | Function 1 |
| 000001 | Function 2 |
| 000010 | Function3 |
| ......... | ......... |
| 111111 | Function 64 |

| Value | Description |
|---|---|
| 00 | The succeeding octet contains data |
| 01 | The succeeding octet contains a length indicator and E bit |
| 10 | This value is the special value of HE field and indicates that the succeeding octet contains data and the last octet of the PDU is the last octet of an SDU. |
| 11 | The succeeding octet contains a functionality mapping as defined in table X. |

| Bit | Description |
|---|---|
| 00000000 | Function 1 |
| 00000001 | Function 2 |
| 00000010 | Function3 |
| ......... | ......... |
| 11111110 | Function 255 |
| 11111111 | The next octet contains a conventional length indicator and e bit |

FIG. 18

METHOD AND APPARATUS FOR ACTIVATION AND DEACTIVATION OF RADIO NETWORK FUNCTIONALITY

CROSS REFERENCE TO RELATED APPLICATION(S)

This application claims the benefit of U.S. Provisional Application No. 61/833,546, filed Jun. 11, 2013, and U.S. Provisional Application No. 61/878,915, filed Sep. 17, 2013. The disclosures of each of the referenced applications are incorporated herein in their entirety by reference.

TECHNICAL FIELD

This disclosure relates generally to peer to peer communications in the radio link control (RLC) protocol and, more particularly, to methods and apparatuses for activation and deactivation of radio network functionality.

BACKGROUND

In Wideband Code Division Multiple Access (WCDMA) systems, existing solutions generally rely on agreed Information Elements (IE's) in the Radio Resource Control (RRC) protocol specification (3GPP TS 25.331 V11.5.0) to activate or deactivate RN functionality. While this methodology may be suitable for a large segment of radio network (RN) functionality, there is consequently also a need to handle proprietary or functionality that may not be of interest to all parties involved in 3GPP standardization.

Existing solutions to activate or deactivate RN functionality generally utilize 3GPP standardized signaling (e.g., Radio Resource Control (RRC) signaling), which means that activation and deactivation of any new RN functionality needs to be agreed upon in the 3GPP standardization. However, since some RN functionality may either be proprietary or not of interest to all parties using 3GPP standards, there is a need for an alternative way to achieve this functionality. Consequently, an efficient way to activate or deactivate RN functionality without changing existing 3GPP standardization is currently missing.

SUMMARY

The present advancements are directed towards adding a service to the RLC sub layer that does not presently exist. The purpose of the new service is to configure RN and UE functionality.

The present advancements disclose a novel way for RN and User Equipment to activate and deactivate functionality by utilizing functionality as defined in the 3GPP RLC protocol specification 3GPP TS 25.322 V11.2.0. The embodiments disclosed herein can either be used in a proprietary fashion or they may be incorporated into the 3GPP Radio Link Control (RLC) protocol specification 3GPP TS 25.322 V11.2.0. As such, the embodiments disclosed herein identify methods and processes for using standardized messages (e.g., informational elements (IEs)) within a radio resource control (RRC) protocol to activate, deactivate, configure, etc., radio network (RN) and mobile station (MS) functionalities. Thus, the present invention, inter alia, adds functionality to the radio link control (RLC) layer.

According to some embodiments, a method implemented in a first peer entity communicating with a second peer entity using a predetermined protocol includes receiving a first packet from the second peer entity. The method further includes identifying an instruction field included within the first packet, the instruction field indicating a predetermined function to be performed by the first peer entity. The method further includes determining whether the predetermined function can be performed by the first entity. The method also includes transmitting a second packet to the second peer entity indicating whether the first entity performs the predetermined function.

In some embodiments, a method implemented in a first peer entity communicating with a second peer entity using a predetermined protocol includes setting an instruction field included within a first packet, the instruction field indicating a predetermined function to be performed by the second peer entity. The method further includes transmitting the first packet to the second peer entity. The method also includes receiving a second packet from the second peer entity indicating whether the second peer entity performs the predetermined function.

According to some embodiments, a first peer entity that communicates with a second peer entity using a predetermined protocol includes a processor, a memory coupled to the processor, a transceiver coupled to the processor, and an antenna coupled to the transceiver configured to transmit and receive messages. The processor is configured to receive a first packet from the second peer entity. The processor is further configured to identify an instruction field included within the first packet, the instruction field indicating a predetermined function to be performed by the first peer entity. The processor is further configured to determine whether the predetermined function can be performed by the first entity. The processor is further configured to transmit a second packet to the second peer entity indicating whether the first entity performs the predetermined function.

In some embodiments, a first peer entity that communicates with a second peer entity using a predetermined protocol includes a processor, a memory coupled to the processor, a transceiver coupled to the processor, and an antenna coupled to the transceiver configured to transmit and receive messages. The processor is configured to set an instruction field included within a first packet, the instruction field indicating a predetermined function to be performed by the second peer entity. The processor is further configured to transmit the first packet to the second peer entity. The processor is also configured to receive a second packet from the second peer entity indicating whether the second peer entity performs the predetermined function.

While the present invention may be described using terminology associated with WCDMA systems, the disclosure may also apply to corresponding nodes, messages, etc., in other types of communication systems (e.g., LTE systems, cellular systems, etc.). For example, a mobile station (MS) can refer to a user device equipped to communicate within a WCDMA system, regardless of whether the device is mobile. Also, for example, in an LTE system, a radio network (RN) node can be defined as an eNodeB, while within the WDCMA system, the RN can comprise a radio network controller (RNC) and a radio base station (RBS), and the user device may be referred to as user equipment (UE).

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 2 is an exemplary illustration of Packet Data Unit (PDU) types.

FIG. 3 is an exemplary illustration of a format of peer to peer message PDU.

FIG. 4 is an exemplary illustration of super field (SUFI) types.

FIG. 5 is an exemplary illustration of super field (SUFI) types.

FIG. 6 is an exemplary illustration of a SUFI.

FIG. 7 is an exemplary illustration of a peer to peer message SUFI.

FIG. 8 is an exemplary illustration of a type field.

FIG. 9 is an exemplary illustration of a type field.

FIG. 10B is an exemplary illustration of a feature tag field.

FIG. 10C is an exemplary illustration of a parameter tag field.

FIG. 11 is an exemplary illustration of a peer to peer message acknowledge SUFI.

FIG. 12 is an exemplary illustration of a peer to peer negative acknowledge SUFI.

FIG. 13 is an exemplary illustration of super field (SUFI) types.

FIG. 18 is an exemplary illustration of function fields.

DETAILED DESCRIPTION

Particular embodiments are directed to methods and apparatuses for activating and deactivating RN functionality. The disclosed techniques may be applicable, for instance, to radio networks using the radio link control (RLC) protocol for peer to peer communications.

Figure 1:
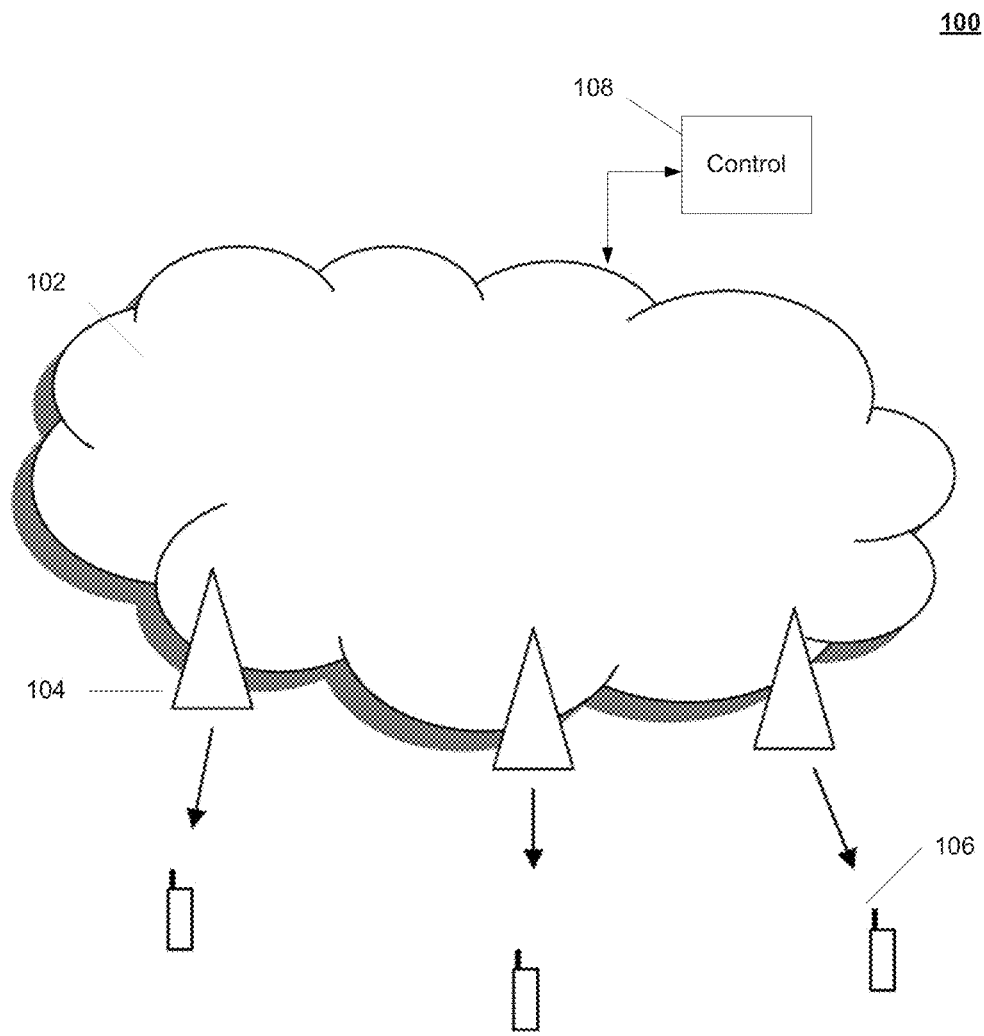
FIG. 1 is an illustration of a wireless communication system in accordance with exemplary embodiments.

Referring to FIG. 1, a wireless communication deployment 100 in accordance with exemplary embodiments includes an access node 104 serving a wireless communication device (WCD) 106. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 106 may be a legacy UE or dynamic TDD capable UE. Access node 104 may be, for example, a base station, an eNodeB, relay node, or gateway type device, and is capable of communicating with device 106, along with any additional elements suitable to support wireless communication between wireless communication devices or between a wireless communication device and another communication device, such as landline telephone. The access node 104 may be in communication with, for instance via a network 102, one or more control nodes 108, such as a Radio Network Controller (RNC), a Mobility Management Entity (MME), a Mobile Switching Center (MSC) or Base Station Subsystem (BSS). Although node 108 is explicitly identified as a control node, each of nodes 104, 106, and 108 may be understood as a "control" node to the extent that it includes a control unit or otherwise implements control functions.

According to some embodiments, in order to provide for configuration of RN and user equipment (UE) functionality, currently reserved bits not utilized by the PDU Type and Super Field (SUFI), header extension (HE), and/or length indicator (LI) fields, as defined in the RLC protocol specification 3GPP TS 25.322 V11.2.0 sections 9.2.2.2, 9.2.2.7, 9.2.2.8, and 9.2.2.11, may be utilized for this purpose. The RLC protocol specification 3GPP TS 25.322 V11.2.0 specification is incorporated herein by reference. In some embodiments, configuring RN and UE functionality using the reserved bits may either be done in a proprietary fashion, in which case the RN and UE vendor's both need to agree to a certain mapping for these bits as exemplified below, or alternatively, the 3GPP RLC protocol specification shall be updated with the following additions concerning the PDU TYPE and SUFI, HE, and LI functionality defined in chapters 9.2.2.2, 9.2.2.7, 9.2.2.8, and 9.2.2.11 of the RLC protocol specification. It is noted that the mappings of functions, parameters and status indications described below for the different embodiments are examples only and other proprietary or 3GPP standardized mappings are possible following agreement between network and UE vendors.

FIG. 2 illustrates an embodiment of a new PDU Type, a peer to peer (PTP) PDU. In some embodiments, the PTP PDU is used to exchange peer to peer information between two RLC AM entities. For example, the PTP PDU may be used by a sender entity to signal to the receiver entity that the receiver entity shall act according to indication in the PTP PDU. In another example, the receiver entity signals to the sender entity another PDU message indicating whether the receiver entity will act or will not act upon the indication in the PTP PDU. In one embodiment, the sender entity is a UE such as wireless device 106, and the receiver entity is access node 104. In another embodiment, the sender entity is access node 104, and the receiver entity is a UE such as wireless device 106.

According to some embodiments, the PTP PDU can be piggybacked in a flexible size AMD PDU or in a fixed size RLC if there is enough room in the AMD PDU.

FIG. 3 illustrates an embodiment of a format of the PTP PDU. In some embodiments, the length of each SUFI is dependent on its type and contents. A PTP PDU can include super-fields of different types. FIG. 4 illustrates an embodiment that provides three new SUFI "Types." These three new fields include a peer to peer message (PTP_MSG), a peer to peer message acknowledge (PTP_MSG_ACK) and a peer to peer message negative message acknowledge (PTP_MSG_NACK). These three new SUFI types enable activation and deactivation of RN and UE functionality without having to change 3GPP standards.

FIG. 5 illustrates an additional embodiment of a format of the PTP PDU. The new fields are assigned to field/values of 1001 and 1010, but can also be assigned to other fields (e.g., 1001 to 1111). As shown in FIG. 5, the new SUFI types are PTP_MSG and the corresponding acknowledgment (ACK) message, PTP_MSG_ACK.

As illustrated in FIG. 6, according to the RLC protocol specification, in some embodiments, a SUFI, such as the new fields (PTP_MSG and PTP_MSG_ACK) in FIGS. 4 and 5, is defined by three fields, "Type," "Length," and "Value." In some embodiments, the new SUFI types includes the "Type," "Length," and "Value" fields, which are defined in further detail below.

FIG. 7 illustrates an embodiment of the PTP_MSG format. The peer to peer message super-field indicates that the receiver peer entity shall act according to a predetermined function included in the PTP_MSG. In some embodiments, the length field is 8 bits and indicates the length of the following "Value" field. The value field may be structured with three fields "Type," "Length," and "Value." The usage of "Length" and "Value" may depend on the setting of the "Type" field as described in further detail.

FIG. 8 illustrates an embodiment of the "Type" field included in the "Value" field of the PTP_MSG format (FIG. 7). In some embodiments, the type Function Management has the value field structured with the three fields "Type," "Length," and "Value." The length may be 8 bits long and used to indicate the length of the following "Value" field. However, the length can also be of other sizes, such as 4 bits, 6 bits, etc. The "Value" field may have several structs with each structured to include the "Type," "Length," and "Value" fields. While fields 0001 and 0010 are indicated as being "Reserved," these fields can also include information (e.g., information1, information2, etc.) that do not have a specified value field.

FIG. 9 illustrates an additional embodiment of the "Type" field. In some embodiments, the type "Function Management" has the value field structured with three fields, such as "Type," "Length," and "Value" fields. The length may be 8 bits long and used to indicate the length of the "Value" field. The value may include a function identifier for length that can be 4 bits and the value can indicate a function. As shown in FIG. 9, fields 0111-1111 may be reserved and not used for the "Type" field.

Figure 10A:
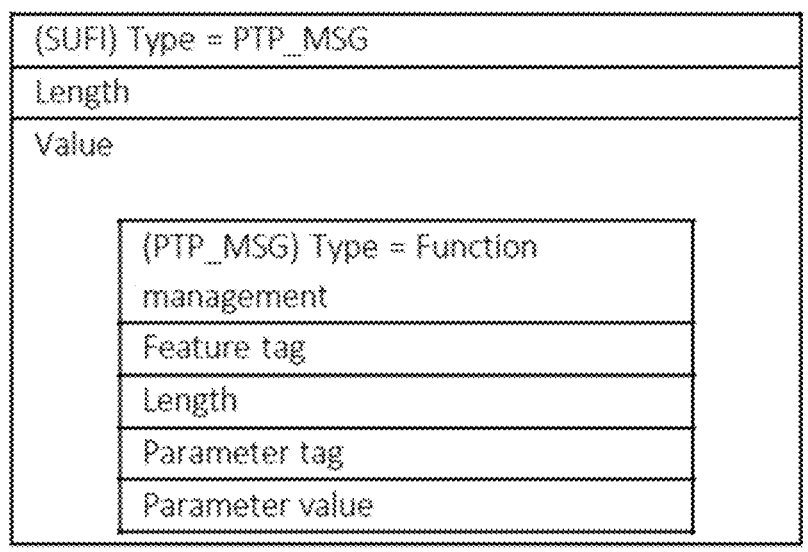
FIG. 10A is an exemplary illustration of a peer to peer message SUFI having a function management type field.

FIG. 10A illustrates an embodiment of a PTP_MSG in which the "Type" of the "Value" field is specified as "Function management." In some embodiments, the "Function management" includes a "Feature tag," a "Length," a "Parameter tag," and a "Parameter value." FIG. 10B illustrates an embodiment of values for the "Feature tag" field. The "Feature tag" field may be 4 bits having the values illustrated in FIG. 10B. For example, the value 0001 corresponds to enabling uplink (UL) compression, while the value 0010 corresponds to disable uplink compression. The enabling and disabling of a function is an example of activating and deactivating a function, respectively. While enabling/disabling UL compression is illustrated in FIG. 10B, it is understood by one of ordinary skill in the art that other desired functions may be implemented, such as enabling/disabling downlink (DL) compression.

The "Length" field may be 4 bits and indicate the number of (Parameter tag, Parameter value) pairs that follow. FIG. 10C illustrates an embodiment of value of the "Parameter tag" field, which may be 4 bits. The parameter tag may be used to further define the "Feature tag." For example, when the "Feature tag" specifies UL compression, the "Parameter tag" may specify a UL data compressor memory size in steps of 1024 Kbytes (0000), a UL compression algorithm method (0001), or a UL compression algorithm version (0010). It is understood by one of ordinary skill in the art that the values for the "Parameter tag" are not limited to those illustrated in FIG. 10C. The "Parameter value" field may be 12 bits and used to further define the "Parameter tag." For example, when the "Parameter tag" indicates a UL data compressor memory size in steps of 1024 Kbytes (0000), the "Parameter value" may specify a number of steps. Similarly, when the "Parameter tag" UL compression algorithm method (0001), the "Parameter value" may specify one of a plurality of compression algorithm methods. Additionally, when the "Parameter tag" is UL compression algorithm version (0010), the "Parameter value" may specify one of a plurality of version of the UL compression algorithm method.

FIG. 11 illustrates an embodiment of a format of a SUFI that specifies the "Type" as PTP_MSG_ACK. In some embodiments, the PTP_MSG_ACK SUFI acknowledges the reception of a PTP_MSG SUFI and indicates that the peer entity will act upon the predetermined function specified in the PTP_MSG SUFI. The "Length" field may be 8 bits long and used to specify the length of the following "Value" field. The "Value" field may have several structs, each structured with the fields "Type," "Length," and "Value" as similarly described in 6.1.1.2.3 of the RLC protocol specification. For example, the value field can be 4 bits for the function identifier which indicates the function of the message. Also, for example, '1111' indicates that a configuration may not be supported.

FIG. 12 illustrates and embodiment of a format of a SUFI that specifies the "Type" as PTP_MSG_NACK. In some embodiments, the PTP_MSG_NACK SUFI acknowledges the reception of the PTP_MSG super field and indicates that the peer entity will not act upon the indication in the PTP_MSG super field. The "Length" field may be 8 bits long and used to specify the length of the following "Value" field. The "Value" field may have several structs, each structured with the fields "Type," "Length," and "Value" as similarly described in 6.1.1.2.3 of the RLC protocol specification.

The following demonstrates examples of when a peer entity will act and will not act upon an indication in PTP_MSG SUFI. An activation request from a RNC is sent to the UE in PTP_MSG in Piggybacked STATUS PDU included in AMD PDU. The PTP_MSG includes the indication to turn a feature on, the algorithm methods that shall be used, the allowed size of the compressor memory and the information about the suggested version of the UL compression algorithm to use. If the specified version of the UL compression algorithm is supported in the UE, the UE will activate the feature and respond to RNC by sending PTP_MSG_ACK in Piggybacked STATUS PDU included in AMD PDU. The PTP_MSG_ACK may include an offset that represents the number of PDU's (sequence numbers) between the response and the first PDU containing part of a compressed SDU. In the case the offset is set to 0, the compression starts immediately.

In the situation where the UE does not support the version of the UL compression algorithm that the RNC specified to use, the UE will not activate the feature. Instead, the UE will respond to the RNC by sending a PTP_MSG_NACK, which may also include the version of the UL compression algorithm that the UE is capable of supporting. The RNC may decide to repeat the activation sequence using a different version of the UL compression algorithm, if it is able to support other versions.

FIG. 13 illustrates an embodiment that provides two new SUFI "Types," activate functionality (ACT_FCT) and acknowledge activated (ACK_ACT). As shown in FIG. 13, the ACT_FCT and ACK_ACT fields have been given the values 1001 and 1010. However, the ACT_FCT and ACK_ACT fields can be given other values (e.g., 1001 to 1111). Additionally, the "Length" and "Value" fields of the ACT_FCT and ACK_ACT fields can be defined by three fields, "Type," "Length," and "Value" fields according to the SUFI description provided in FIG. 6. In embodiments, the last SUFI ("Poll") defined in the RLC layer protocol specification is defined in section 9.2.2.11.9 and, thus, the ACT_FCT and ACK_ACT fields can be added to the specification as 9.2.2.11.10 and 9.2.2.11.11, respectively.

Figures 14, 15:
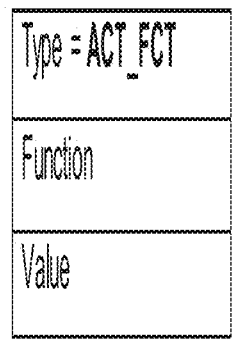
FIG. 14 is an exemplary illustration of an activate functionality SUFI.
FIG. 15 is an exemplary illustration of function fields.

FIG. 14 illustrates an embodiment of the ACT_FCT format. The "Activate Functionality" super-field indicates that a peer entity can change a feature state for a pre-defined designated functionality. In some embodiments, the ACT_FCT fields can be in a "STATUS" PDU. In other embodiments, the ACT_FCT field can be defined by "Function" and "Value" fields.

FIG. 15 illustrates a "Function" field by defining for which functionality a "VALUE" field applies. For example, value "000000" can indicate function 1, and value "000001" can indicate a different function, such as function 2. In embodiments, the length of the "Function" field can be 6 bits; however, the "Function" field can also be 4 bits, 8 bits, etc.

In certain embodiments, the "Value" field can be 6 bits in length and can be used to define a subset of activation properties for functionality. For example, value "000000" may indicate "off," while value "000001" may indicate "on," or vice versa. Alternatively, value "000000" may indicate "off" while value "000001" may indicate "on" for an uplink direction; and value "000010" is "off" and "000011" is "on" for a downlink direction. In another example, these values (e.g., "00010," "00011," etc.) can be used to indicate parameters or values for certain functions. Thus, values "000100-111111" can be made available for other functions and/or proprietary mapping.

Figures 16, 17:
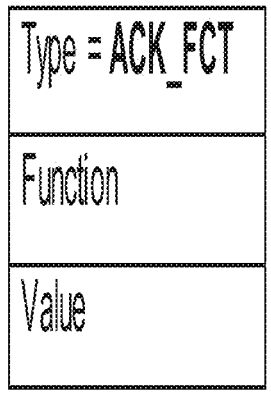
FIG. 16 is an exemplary illustration of an acknowledge functionality SUFI.
FIG. 17 is an exemplary illustration of header extension (HE) type fields.

FIG. 16 illustrates an embodiment of the ACK_FCT format. The "Acknowledge Functionality" super-field acknowledges the reception of an Activate Functionality SUFI and activation state. In embodiments, the ACK_FCT fields can be in a "STATUS" PDU. In some embodiments, the ACK_FCT field can be defined by "Function" and "Value" fields. In embodiments, the length of the "Function" field can be 6 bits; however the "Function" field can also be 4 bits, 8 bits, etc. The "Function" field can indicate which feature the "Value" field can carry information. For example, value "000000" can indicate "Function 1" and value "000001" can indicate "Function 2," which may be different than "Function 1."

In some embodiments, the "Value" field can be 6 bits in length and can be used to define a subset of activation properties for functionality. For example, the value "000000" may indicate "off," the value "000001" may indicate "on," and the value "000010" may indicate "configuration not supported." Additionally, or alternatively, values "000100-111111" can be made available for other functions and/or proprietary mapping.

In alternate embodiments, if the mapping described for sections 9.2.2.11.10 and 9.2.2.11.11 are not introduced in the 3GPP standard, a similar mapping utilizing reserved SUFI bits may be agreed upon as proprietary mapping between an RN and MS vendor.

In other embodiments, to achieve the desired RN functionality as described in the above SUFI mappings, a combination of the reserved bits for header extension (HE) type (section 9.2.2.7) and length indicator (LE) type (section 9.2.2.8) may also be used. FIG. 17 illustrates an embodiment of HE formats. As shown in FIG. 17, the length of the fields is 2 bits; however, the length can also be 4 bits, 6 bits, etc. The 2 bit field indicates if the next octet is data or a "Length Indicator" according to an extension (E) bit.

FIG. 18 illustrates a "Function" field by defining for which functionality a "VALUE" field applies. For example, value "00000000" can indicate function 1, and value "0000001" can indicate a different function, such as function 2. In embodiments, the length of the "Function" field can be 6 bits; however, the "Function" field can also be 4 bits, 8 bits, etc.

In some embodiments, when, in FIG. 17, HE equals the value "11," the table shown in FIG. 18 can provide the next octet which includes the functionality mapping. Examples of the functionality mappings are the same as the SUFI fields as described above (e.g., turn on, turn off, acknowledgments that functionality has been switched on or off, indication that turning on or off is not supported, indications to use certain parameters/values, etc.).

Figure 19:
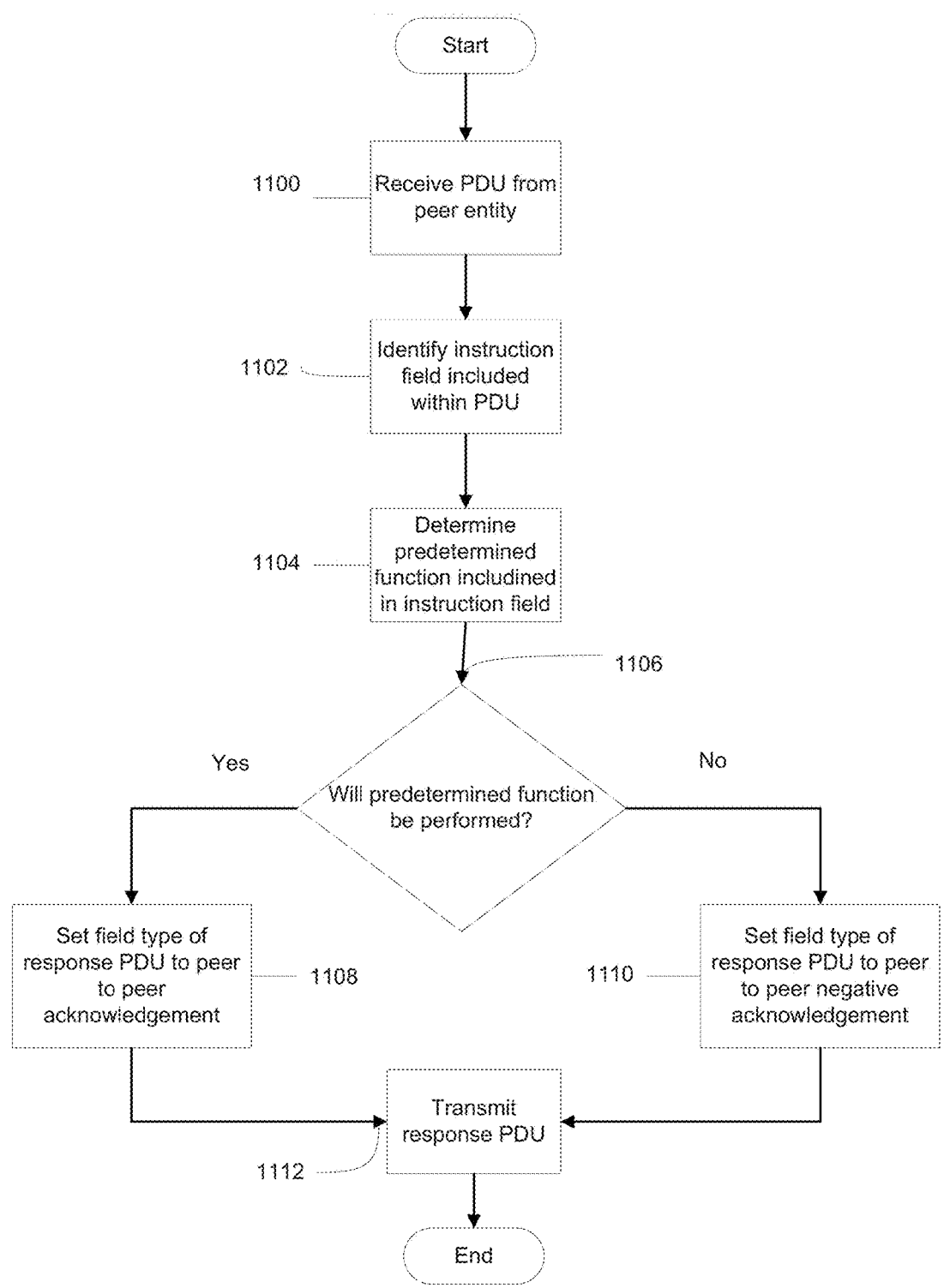
FIG. 19 is an exemplary illustration of a process performed by a receiving peer entity.

FIG. 19 illustrates an embodiment of an exemplary process performed by a receiver peer entity. FIG. 19 illustrates one or more of the fields as described in FIGS. 2-18. The process may generally start at step 1100 where the receiver peer entity receives a PDU (e.g., PTP_MSG, ACK_FCT, etc.) form a sender peer entity. The process proceeds to step 1102 where the instruction field included in the received PDU is identified using the structure of the PDU described above for the PTP_MSG. In step 1104, the predetermined function included in the instruction field is included. In step 1106, it is determined whether the predetermined function will be performed. If the predetermined function will be performed, the PTP_MSG_ACK field type is set in a response PDU in step 1108. If the predetermined function will not be performed, the PTP_MSG_NACK field type is set in the response PDU in step 1110. In step 1112, the response PDU is transmitted to the sender peer entity.

Figure 20:
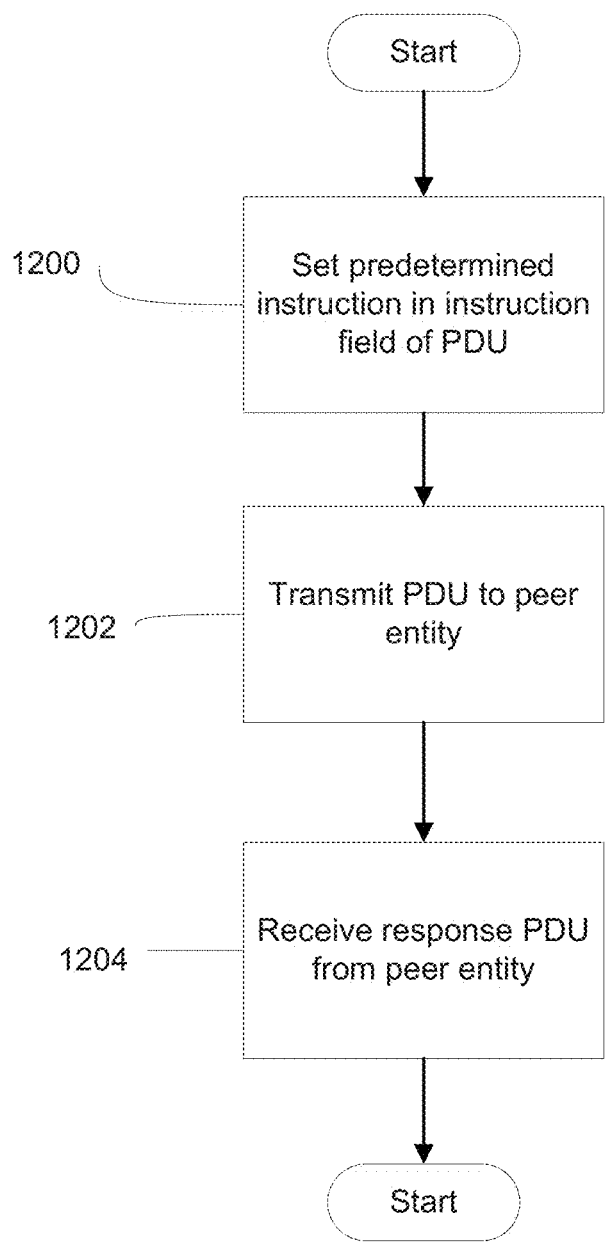
FIG. 20 is an exemplary illustration of a process performed by a sending peer entity.

FIG. 20 illustrates an embodiment of an exemplary process performed by a sender peer entity. The process may generally start at step 1200 where a predetermined instruction is set in an instruction field of a PDU (e.g., PTP_MSG). In step 1202, the PDU is transmitted to a receiver peer entity. In step 1204, a response PDU is received from the receiver peer entity.

Figure 21:
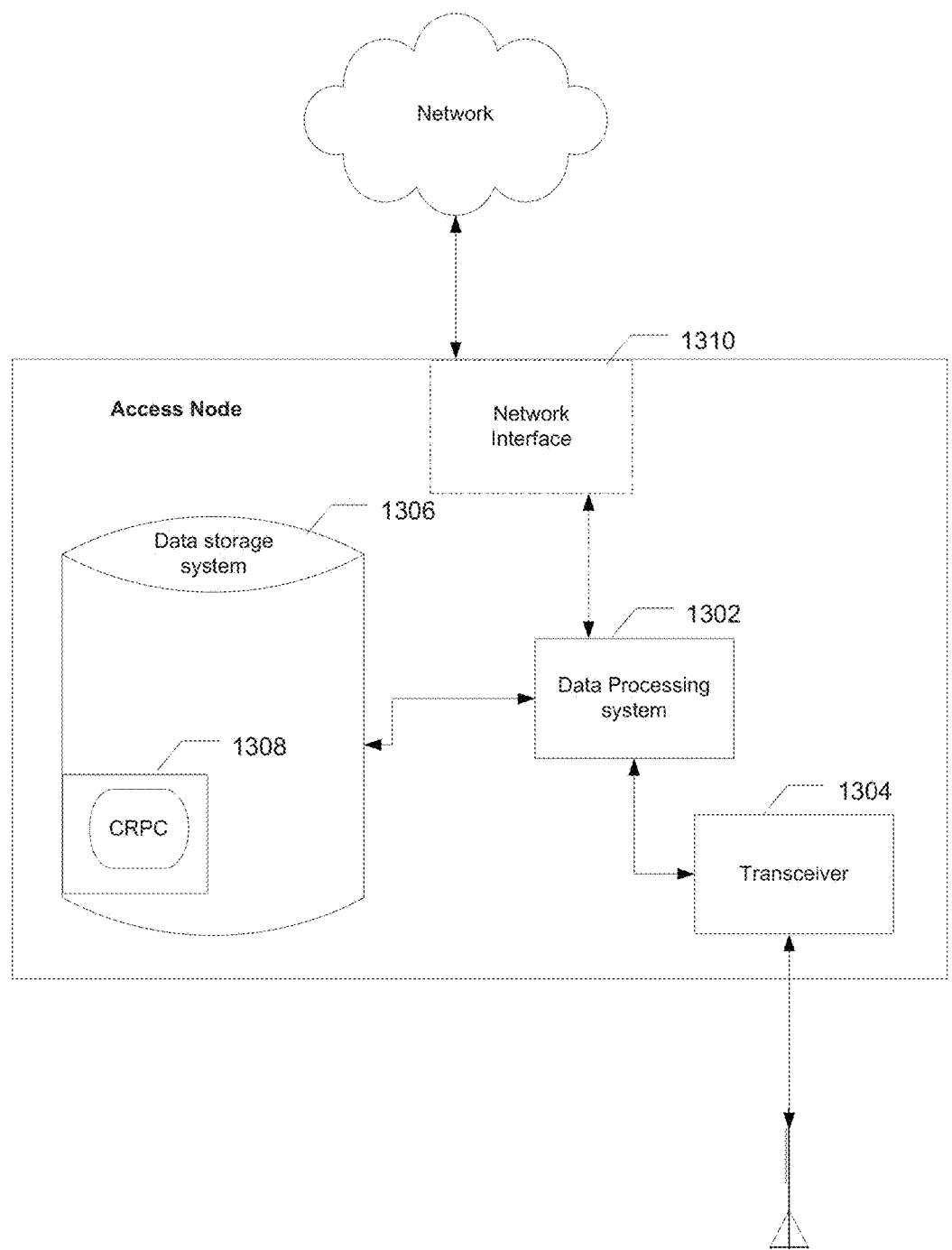
FIG. 21 is an exemplary illustration of an access node.

FIG. 21 illustrates a block diagram of an exemplary access node, such as node 104 shown in FIG. 1. As shown in FIG. 21, the access node 104 may include: a data processing system 1302, which may include one or more microprocessors and/or one or more circuits, such as an application specific integrated circuit (ASIC), field-programmable gate arrays (FPGAs), and the like; a network interface 1310; a transceiver 1304, and a data storage system 1306, which may include one or more non-volatile storage devices and/or one or more volatile storage devices (e.g., random access memory (RAM)). According to some embodiments, the data processing system 1302 may comprise a control unit used for selection of transmission parameters.

In embodiments where data processing system 1302 includes a microprocessor, computer readable program code (CRPC) 1308 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1302 to perform steps described above (e.g., steps described above with reference to the flow charts shown in FIGS. 19 and 20). In other embodiments, the access node 104 is configured to perform steps described herein without the need for code. That is, for example, data processing system 1302 may consist merely of one or more ASICs. Hence, the features of the embodiments described herein may be implemented in hardware and/or software. For example, in particular embodiments, the functional components of the base station described above may be implemented by data processing system 1302 executing computer instructions, by data processing system 1302 operating independent of any computer instructions, or by any suitable combination of hardware and/or software.

Figure 22:
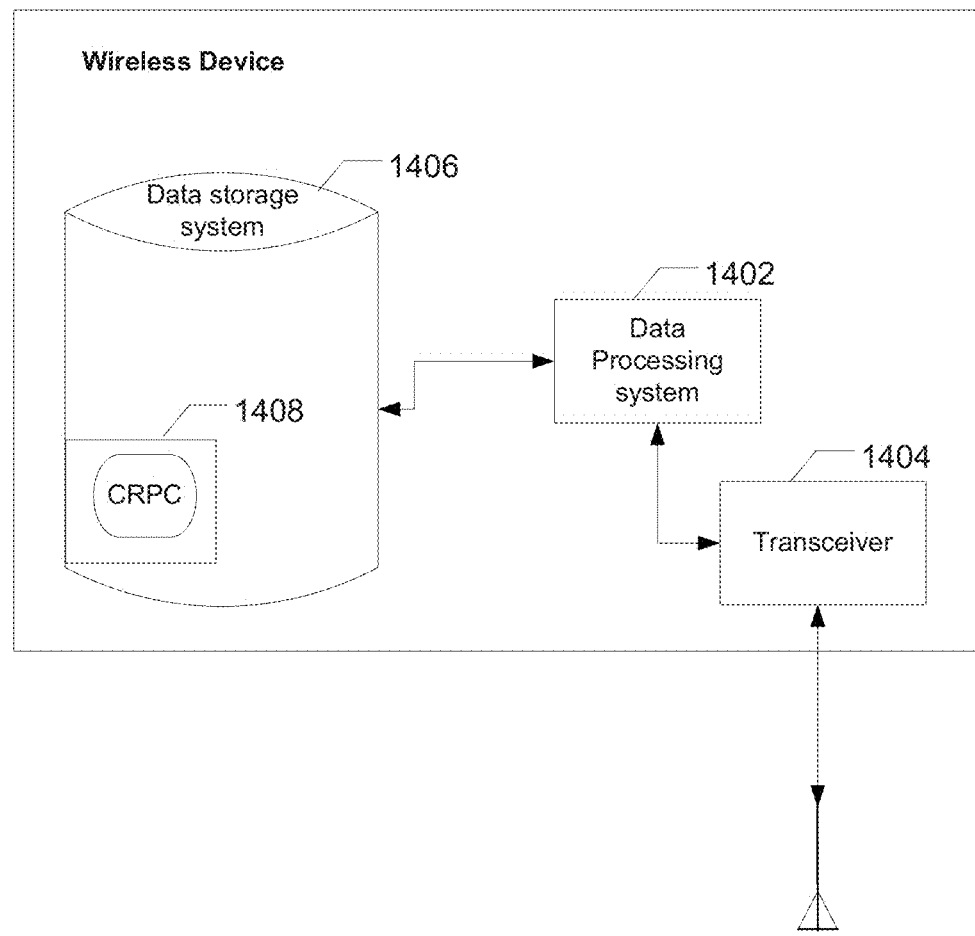
FIG. 22 is an exemplary illustration of a wireless device.

FIG. 22 illustrates a block diagram of an exemplary wireless device, such as device 106 shown in FIG. 1. As shown in FIG. 22, the device 106 may include: a data processing system 1402, which may include one or more microprocessors and/or one or more circuits, such as an application specific integrated circuit (ASIC), field-programmable gate arrays (FPGAs), and the like; a transceiver 1404, and a data storage system 1406, which may include one or more non-volatile storage devices and/or one or more volatile storage devices (e.g., random access memory (RAM)). According to some embodiments, the data processing system 1402 may comprise a control unit used for selection of transmission parameters.

In embodiments, where data processing system 1402 includes a microprocessor, computer readable program code (CRPC) 1408 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1402 to perform steps described above (e.g., steps described above with reference to the flow charts shown in FIGS. 19 and 20). In other embodiments, the device 106 is configured to perform steps described herein without the need for code. That is, for example, data processing system 1402 may consist merely of one or more ASICs. Hence, the features of the embodiments described herein may be implemented in hardware and/or software. For example, in particular embodiments, the functional components of the base station described above may be implemented by data processing system 1402 executing computer instructions, by data processing system 1402 operating independent of any computer instructions, or by any suitable combination of hardware and/or software.

Figure 23:
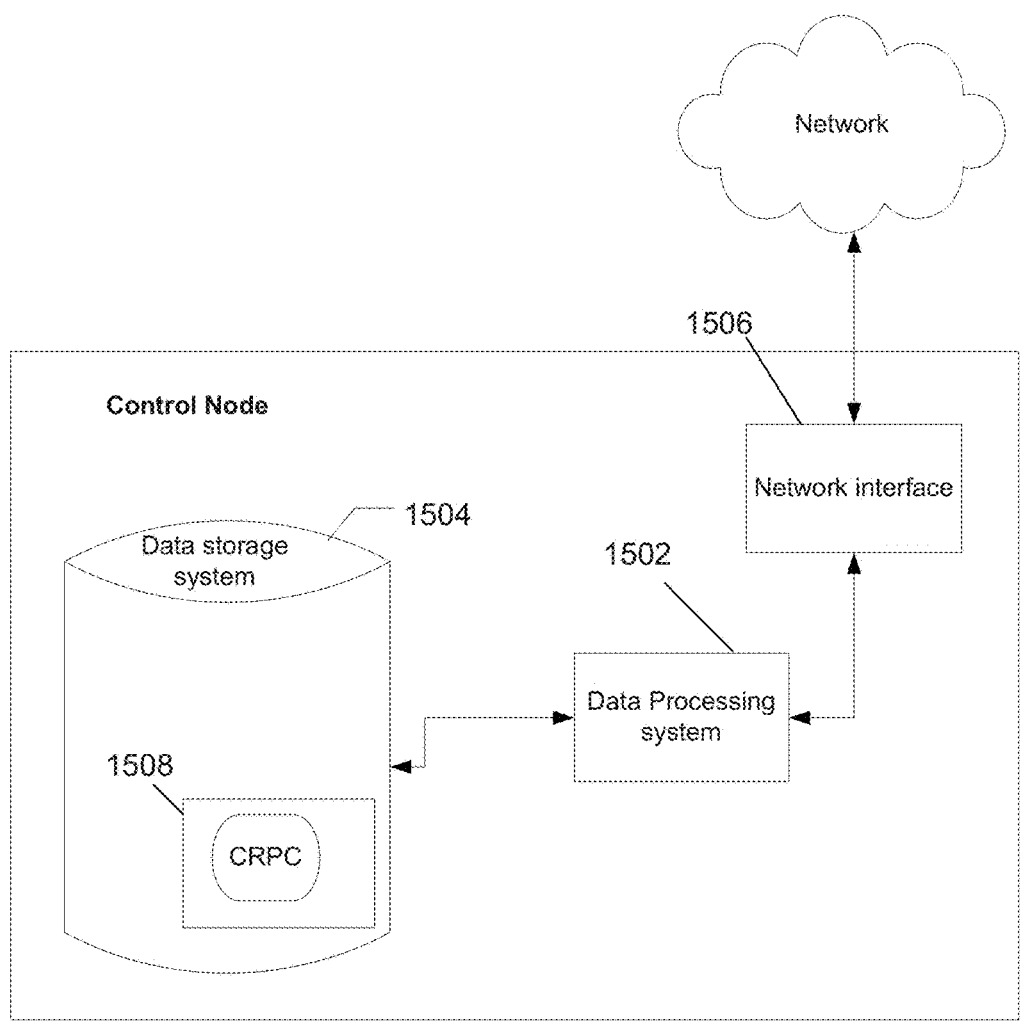
FIG. 23 is an exemplary illustration of a control node.

FIG. 23 illustrates a block diagram of an exemplary control node, such as node 108 shown in FIG. 1. As shown in FIG. 23, the control node 108 may include: a data processing system 1502, which may include one or more microprocessors and/or one or more circuits, such as an application specific integrated circuit (ASIC), field-programmable gate arrays (FPGAs), and the like; a network interface 1506, and a data storage system 1504, which may include one or more non-volatile storage devices and/or one or more volatile storage devices (e.g., random access memory (RAM)). According to some embodiments, the data processing system 1502 may comprise a control unit used for selection of transmission parameters.

In embodiments where data processing system 1502 includes a microprocessor, computer readable program code (CRPC) 1508 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1502 to perform steps described above (e.g., steps described above with reference to the flow charts shown in FIGS. 19 and 20). In other embodiments, the control node 108 is configured to perform steps described herein without the need for code. That is, for example, data processing system 1502 may consist merely of one or more ASICs. Hence, the features of the embodiments described herein may be implemented in hardware and/or software. For example, in particular embodiments, the functional components of the base station described above may be implemented by data processing system 1502 executing computer instructions, by data processing system 1502 operating independent of any computer instructions, or by any suitable combination of hardware and/or software.

The advantages of the present embodiments include activation and deactivation of proprietary RN functionality in UE and RN in an efficient manner without having to be standardized in 3GPP. However, the functionality as disclosed herein may also be standardized if an agreement can be reached in 3GPP to add this functionality in the RLC protocol specification.

ABBREVIATIONS

3GPP $3^{rd}$ Generation Partnership Project
HE Header Extension
IE Information Element
LI Length Indicator
LTE Long Term Evolution
MS Mobile Stations
NW Network
PDU Protocol Data Unit
RLC Radio Link Control
RN Radio Network
RBS Radio Base Station (Node B)
RRC Radio Resource Controller
SDU Service Data Unit
SUFI Super Field
UE User Equipment
UL Uplink
UTRAN Universal Terrestrial Radio Access Network
WCDMA Wideband Code Division Multiple Access Although terminology from 3GPP HSPA has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB and GSM, may also benefit from exploiting the ideas covered within this disclosure.

Furthermore, the terminology such as NodeB and UE are non-limiting and does in particular not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

What is claimed is:

1. A method implemented in a first peer entity communicating with a second peer entity using a radio link control (RLC) predetermined protocol, the method comprising:

the first peer entity receiving a first packet from the second peer entity, the first packet being a peer-to-peer packet data unit (PTP PDU) partitioned into at least a field type and a value field, wherein the field type specifies the first packet as a peer-to-peer message (PTP_MSG), where the PTP_MSG includes an indication of a predetermined function, a version of a compression algorithm from a plurality of versions of compression algorithms to be used by the first peer entity and an allowed size of a compressor memory;

the first peer entity identifying an instruction field included within the value field of the first packet, the instruction field indicating the predetermined function to be performed by the first peer entity the first peer entity analyzing the identified instruction field;

the first peer entity determining whether the predetermined function is capable of being performed by the first entity based on the analysis of the identified instruction field; and the first peer entity transmitting a second packet to the second peer entity indicating whether the first entity is capable of performing the predetermined function, the second packet being the PTP PDU that is partitioned into at least the field type and the value field, the field type including a peer-to-peer acknowledgement message (PTP_MSG_ACK) indicating that the first peer entity is capable of performing the predetermined function or a peer-to-peer negative acknowledgement message (PTP_MSG_NACK) indicating that the first peer entity is not, capable of performing the predetermined function, wherein the PTP_MSG, PTP_MSG_ACK and the PTP_MSG_NACK are super field (SUFI) types included in the PTP PDU, wherein the SUFI types enable activation and deactivation of the predetermined function associated with the first peer entity and the second peer entity.

2. The method according to claim 1, wherein the first peer entity is a user equipment (UE) and the second peer entity is a base station.

3. The method according to claim 1, wherein the first peer entity is a base station and the second peer entity is a user equipment (UE).

4. The method according to claim 1, further comprising:
the first peer entity setting the field type of the second packet to the PTP_MSG_ACK message if the first peer entity supports the feature.

5. The method according to claim 1, further comprising:
the first peer entity setting the field type of the second packet to the PTP_MSG_NACK message if the first peer entity does not support the specified version of the compression algorithm.

6. The method according to claim 1, wherein the first and second packets are transmitted on a RLC sublayer over a wireless radio network.

7. The method according to claim 1, wherein in response to determining that the first peer entity supports the specified feature, the first peer entity activates the specified feature and the second message includes an acknowledgement indicating that the first peer entity supports the specified feature, and wherein in response to determining that the first peer entity does not support the specified feature, the second message includes a negative acknowledgement indicating that the first peer entity does not support the specified feature.

8. The method according to claim 1, wherein in response to determining that the first peer entity supports the specified version of the algorithm, the second message includes an acknowledgement indicating that the first peer entity supports the feature, and wherein in response to determining that the first peer entity does not support the specified version of the algorithm, the second message includes a negative acknowledgement indicating that the first peer entity does not support the specified version of the algorithm.

9. The method of claim 1, wherein the PTP PDU is piggybacked in a flexible size Acknowledged mode Data Packet Data (AMD PDU) or in a fixed size RLC in the AMD PDU.

10. A first peer entity that communicates with a second peer entity using a radio link control (RLC) predetermined protocol, the first peer entity comprising:

a processor;
a memory coupled to the processor;
a transceiver coupled to the processor; and
an antenna coupled to the transceiver configured to transmit and receive messages,
wherein the processor is configured to:
receive a first packet from the second peer entity, the first packet being a peer-to-peer packet data unit (PTP PDU) partitioned into at least a field type and a value field,
wherein the field type specifies the first packet as a peer-to-peer message (PTP MSG), wherein the PTP_MSG includes an indication of a predetermined function, a version of a compression algorithm from a plurality of versions of compression algorithms to be used by the first peer entity and an allowed size of a compressor memory;
identify an instruction field included within the value field of the first packet, the instruction field indicating the predetermined function to be performed by the first peer entity,
analyze the identified instruction field,
determine whether the predetermined function is capable of being performed by the first entity based on the analysis of the instruction field, and
transmit, prior to performance of the predetermined function, a second packet to the second peer entity indicating whether the first entity is capable of performing the predetermined function, the second packet being the PTP PDU that is partitioned into at least the field type and the value field, the field type including a peer-to-peer acknowledgement message (PTP_MSG_ACK) indicating that the first peer entity is capable of performing the predetermined function or a peer-to-peer negative acknowledgement message (PTP_MSG_NACK) indicating that the first peer entity is not, capable of performing the predetermined function,
wherein the PTP_MSG, PTP_MSG_ACK and the PTP_MSG_NACK are super-field (SUFI) types included in the PTP PDU, where the SUFI types enable activation and deactivation of the predetermined function associated with the first peer entity and the second peer entity.

11. The first peer entity according to claim 10, wherein the first peer entity is a user equipment (UE) and the second peer entity is a base station.

12. The first peer entity according to claim 10, wherein the first peer entity is a base station and the second peer entity is a user equipment (UE).

13. The first peer entity according to claim 10, wherein the processor is further configured to:
set the field type of the second packet to the PTP_MSG_ACK message if the first peer entity supports the feature.

14. The first peer entity according to claim 10, wherein the processor is further configured to:
set the field type of the second packet to PTP_MSG_NACK message if the first peer entity does not support the specified version of the compression algorithm.

15. A first peer entity that communicates with a second peer entity using a radio link control (RLC) predetermined protocol, the first peer entity comprising:
a processor;
a memory coupled to the processor;
a transceiver coupled to the processor; and
an antenna coupled to the transceiver configured to transmit and receive messages, wherein the processor is configured to:

set an instruction field included within a first packet, the instruction field indicating a predetermined function to be performed by the second peer entity, wherein the first packet is a peer-to-peer packet data unit (PDU) partitioned into at least a field type and a value field, wherein the field type specifies the first packet as a peer-to-peer message and the instruction is included in the value field, wherein the instruction field in the first packet specifies a feature to be activated in the first peer entity and the instruction field in the first packet specifies a version of a compression algorithm from a plurality of versions of compression algorithms to be used by the first peer entity, transmit the first packet to the second peer entity, and receive a second packet from the second peer entity indicating whether the second peer entity is capable of performing the predetermined function based on an analysis of the instruction field, wherein the second packet is a peer-to-peer PDU that is partitioned into at least the field type and the value field, wherein the field type includes a peer-to-peer acknowledgement message or a peer-to-peer negative acknowledgement message based on whether the second peer entity is capable of performing the predetermined function, wherein the PTP_MSG, PTP_MSG_ACK and the PTP_MSG_NACK are super-field (SUFI) types included in the PTP PDU, where the SUFI types enable activation and deactivation of the predetermined function associated with the first peer entity and the second peer entity.

16. The first peer entity according to claim 15, wherein the first peer entity is a user equipment (UE) and the second peer entity is a base station.

17. The first peer entity according to claim 15, wherein the first peer entity is a base station and the second peer entity is a user equipment (UE).

18. The first peer entity according to claim 15, wherein the field type of the second packet is set to a peer-to-peer acknowledgment message if the second peer entity performs the predetermined function.

19. The first peer entity according to claim 15, wherein the field type of the second packet is set to a peer-to-peer negative acknowledgment message if the second peer entity does not perform the predetermined function.

* * * * *